US008166388B2

(12) United States Patent
Gounares et al.

(10) Patent No.: US 8,166,388 B2
(45) Date of Patent: Apr. 24, 2012

(54) OVERLAYING ELECTRONIC INK

(75) Inventors: Alexander Gounares, Kirkland, WA (US); Steve Dodge, Sammamish, WA (US); Tobiasz A. Zielinski, Redmond, WA (US); Arin J. Goldberg, Woodinville, WA (US); Eugene A. Tsimberg, Bellevue, WA (US); Todd A. Torset, Woodinville, WA (US); Robert L. Chambers, Sammamish, WA (US); Timothy H. Kannapel, Bellevue, WA (US); Rudolph Balaz, Redmond, WA (US); Subha Bhattacharyay, Bellevue, WA (US); Manoj K. Biswas, Bellevue, WA (US); Bodin Dresevic, Bellevue, WA (US); Stephen A. Fisher, Kenmore, WA (US); Brigette E. Krantz, Redmond, WA (US); Shiraz M. Somji, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 1915 days.

(21) Appl. No.: 10/183,987

(22) Filed: Jun. 28, 2002

(65) Prior Publication Data

US 2003/0217336 A1 Nov. 20, 2003

Related U.S. Application Data

(60) Provisional application No. 60/379,749, filed on May 14, 2002, provisional application No. 60/379,781, filed on May 14, 2002.

(51) Int. Cl.
*G06N 3/00* (2006.01)
(52) U.S. Cl. .......................... 715/230; 715/231; 715/233

(58) Field of Classification Search ............... 715/500.1, 715/517, 513, 540, 541, 523, 530, 230, 231, 715/233, 234, 243, 254; 455/556.2, 566
See application file for complete search history.

(56) References Cited

U.S. PATENT DOCUMENTS

| 5,125,039 | A | | 6/1992 | Hawkins |
| 5,220,649 | A | | 6/1993 | Forcier |
| 5,309,555 | A | | 5/1994 | Akins et al. |
| 5,347,295 | A | | 9/1994 | Agulnick et al. |
| 5,367,453 | A | | 11/1994 | Capps et al. |
| 5,404,442 | A | | 4/1995 | Foster et al. |
| 5,500,937 | A | | 3/1996 | Thompson-Rohrlich |
| 5,528,743 | A | * | 6/1996 | Tou et al. ................... 715/541 |

(Continued)

FOREIGN PATENT DOCUMENTS

EP  0 566 293 A2  10/1993

(Continued)

OTHER PUBLICATIONS

"Photoshop(r) 6 Complete," 2001, Sybex Inc., pp. 123-153.*

(Continued)

*Primary Examiner* — Kyle Stork
(74) *Attorney, Agent, or Firm* — Woodcock Washburn LLP

(57) ABSTRACT

Overlaying electronic ink over a document. A typical scenario may be where one it would be useful to mark up a document with electronic ink, such as by making handwritten comments, drawings, and the like over the underlying document. In some embodiments, a developer may easily define an inking surface, such as a transparent or opaque window, over a document. The inking surface may act as an input interface such that a user may write onto the inking surface such that is appears that the document itself is being marked up.

18 Claims, 7 Drawing Sheets

U.S. PATENT DOCUMENTS

| | | | |
|---|---|---|---|
| 5,534,893 A | | 7/1996 | Hansen, Jr. et al. |
| 5,546,538 A | * | 8/1996 | Cobbley et al. ............... 709/203 |
| 5,548,705 A | | 8/1996 | Moran et al. |
| 5,561,446 A | | 10/1996 | Montlick |
| 5,583,543 A | * | 12/1996 | Takahashi et al. ............ 345/173 |
| 5,680,480 A | | 10/1997 | Beernink et al. |
| 5,682,439 A | | 10/1997 | Beernink et al. |
| 5,710,573 A | * | 1/1998 | Hung et al. .................... 345/634 |
| 5,710,831 A | | 1/1998 | Beernink et al. |
| 5,749,070 A | | 5/1998 | Gourdol |
| 5,761,328 A | | 6/1998 | Solberg et al. |
| 5,761,538 A | | 6/1998 | Hull |
| 5,850,480 A | | 12/1998 | Scanlon |
| 5,862,256 A | | 1/1999 | Zetts et al. |
| 5,893,126 A | | 4/1999 | Drews et al. |
| 5,917,493 A | | 6/1999 | Tan et al. |
| 5,953,523 A | | 9/1999 | Martinez et al. |
| 6,000,946 A | * | 12/1999 | Snyders et al. ............... 434/365 |
| 6,002,799 A | | 12/1999 | Sklarew |
| 6,088,481 A | | 7/2000 | Okamoto et al. |
| 6,128,007 A | | 10/2000 | Seybold |
| 6,282,316 B1 | | 8/2001 | Arai |
| 6,320,601 B1 | | 11/2001 | Takasu et al. |
| 6,355,889 B1 | | 3/2002 | Butcher et al. |
| 6,356,655 B1 | | 3/2002 | Sumikawa et al. |
| 6,389,435 B1 | * | 5/2002 | Golovchinsky et al. ...... 715/512 |
| 6,408,091 B1 | | 6/2002 | Sakaguchi et al. |
| 6,493,464 B1 | | 12/2002 | Hawkins et al. |
| 6,563,494 B1 | | 5/2003 | Eichstaedt et al. |
| 6,565,611 B1 | | 5/2003 | Wilcox et al. |
| 6,567,549 B1 | | 5/2003 | Marianetti, II et al. |
| 6,584,479 B2 | * | 6/2003 | Chang et al. .................. 715/512 |
| 6,661,409 B2 | | 12/2003 | Demartines et al. |
| 6,741,749 B2 | | 5/2004 | Herbert, Jr. |
| 6,813,396 B1 | | 11/2004 | Hollstrom et al. |
| 6,903,751 B2 | | 6/2005 | Saund et al. |
| 6,909,439 B1 | | 6/2005 | Amro et al. |
| 6,924,791 B1 | | 8/2005 | Nicolas et al. |
| 6,961,029 B1 | | 11/2005 | Canova et al. |
| 2001/0040551 A1 | | 11/2001 | Yates |
| 2002/0095440 A1 | * | 7/2002 | Burgess et al. ............... 707/513 |
| 2002/0136462 A1 | | 9/2002 | Hebert |
| 2003/0215140 A1 | | 11/2003 | Gounares et al. |
| 2008/0170789 A1 | | 7/2008 | Thacker |

FOREIGN PATENT DOCUMENTS

| | | |
|---|---|---|
| JP | 6-310472 | 11/1994 |
| JP | 08069351 | 12/1996 |
| JP | 09160914 | 6/1997 |
| JP | 9-305698 | 11/1997 |
| JP | 10069479 | 3/1998 |
| JP | 2001-266071 | 9/2001 |

OTHER PUBLICATIONS

Walid G. Aref, et al., "On Handling Electronic Ink", ACM Computing Surveys, vol. 27, No. 4, Dec. 1995, pp. 564-567.

David R. Millen, "Pen-Based User Interfaces", AT&T Technical Journal, May/Jun. 1993, pp. 21-27.

Nancy J. Freehafer, Handwriting Recognition in Office XP, Jul. 30, 2001.

* cited by examiner

OVERLAYING ELECTRONIC INK

RELATED APPLICATIONS

This application claims priority to U.S. Provisional Applications Ser. Nos. 60/379,749 and 60/379,781, both filed on May 14, 2002, both entitled, "Interfacing With Ink," both expressly incorporated by reference herein as to their entire contents, including their appendices.

FIELD OF THE INVENTION

Aspects of the present invention are directed generally to methods and apparatus for overlaying electronic ink, and more particularly to an application programming interface that allows a developer to easily utilize various ink overlaying features.

BACKGROUND

Typical computer systems, especially computer systems using graphical user interface (GUI) systems such as Microsoft WINDOWS, are optimized for accepting user input from one or more discrete input devices such as a keyboard for entering text, and a pointing device such as a mouse with one or more buttons for driving the user interface. The ubiquitous keyboard and mouse interface provides for fast creation and modification of documents, spreadsheets, database fields, drawings, photos and the like. However, there is a significant gap in the flexibility provided by the keyboard and mouse interface as compared with the non-computer (i.e., standard) pen and paper. With the standard pen and paper, a user edits a document, writes notes in a margin, and draws pictures and other shapes and the like. In some instances, a user may prefer to use a pen to mark-up a document rather than review the document onscreen because of the ability to freely make notes outside of the confines of the keyboard and mouse interface.

Some computer systems permit a user to draw on a screen. For example, the Microsoft READER application permits one to add electronic ink (also referred to herein as "ink") to a document. The system stores the ink and provides it to a user when requested. Other applications (for example, drawing applications as known in the art are associated with the Palm 3.x and 4.x and PocketPC operating systems) permit the capture and storage of drawings. Also, various drawing applications such as Coral Draw and photo and editing applications such as Photoshop may be used with stylus based input products, such as the Wacom tablet product. These drawings include other properties associated with the ink strokes used to make up the drawings. For instance, line width and color may be stored with the ink. One goal of these systems is to replicate the look and feel of physical ink being applied to a piece of paper. However, physical ink on paper may have significant amounts of information not captured by the electronic collection of a coordinates and connecting line segments. Some of this information may include the thickness of the pen tip used (as seen through the width of the physical ink) or angle of the pen to the paper, the shape of the pen tip, the speed at which the ink was deposited, and the like.

Another problem has arisen with electronic ink. It has been considered part of the application in which it is written. This leads to a fundamental inability to provide the richness of electronic ink to other applications or environments. While text may be ported between a variety of application (through use, for example, of a clipboard), ink fails to have this ability of being able to interact with the ink. For example, one could not create an image of a figure eight, copy and paste the created image into a document by means of the clipboard, and then make the ink bold. One difficulty is the non-portability of the image between applications.

SUMMARY OF THE INVENTION

Aspects of the present invention provide a flexible and efficient interface for interacting with properties, invoking methods and/or receiving events related to electronic ink, thereby solving one or more of the problems identified with conventional devices and systems. Some aspects of the present invention relate to improving the content of stored ink. Other aspects relate to modifying stored ink.

It may be desirable to enable developers to easily add first-class support for ink features to their existing and new applications. It is also desirable to encourage the adoption of a consistent look and feel to ink-enabled applications. For example, it may be desirable to be able to add support for writing on and/or interacting with documents that may or may not normally accept ink input.

These and other features of the invention will be apparent upon consideration of the following detailed description of preferred embodiments.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

Below is described a way to overlay electronic ink on a document.

General Computing Platforms

Figure 1:
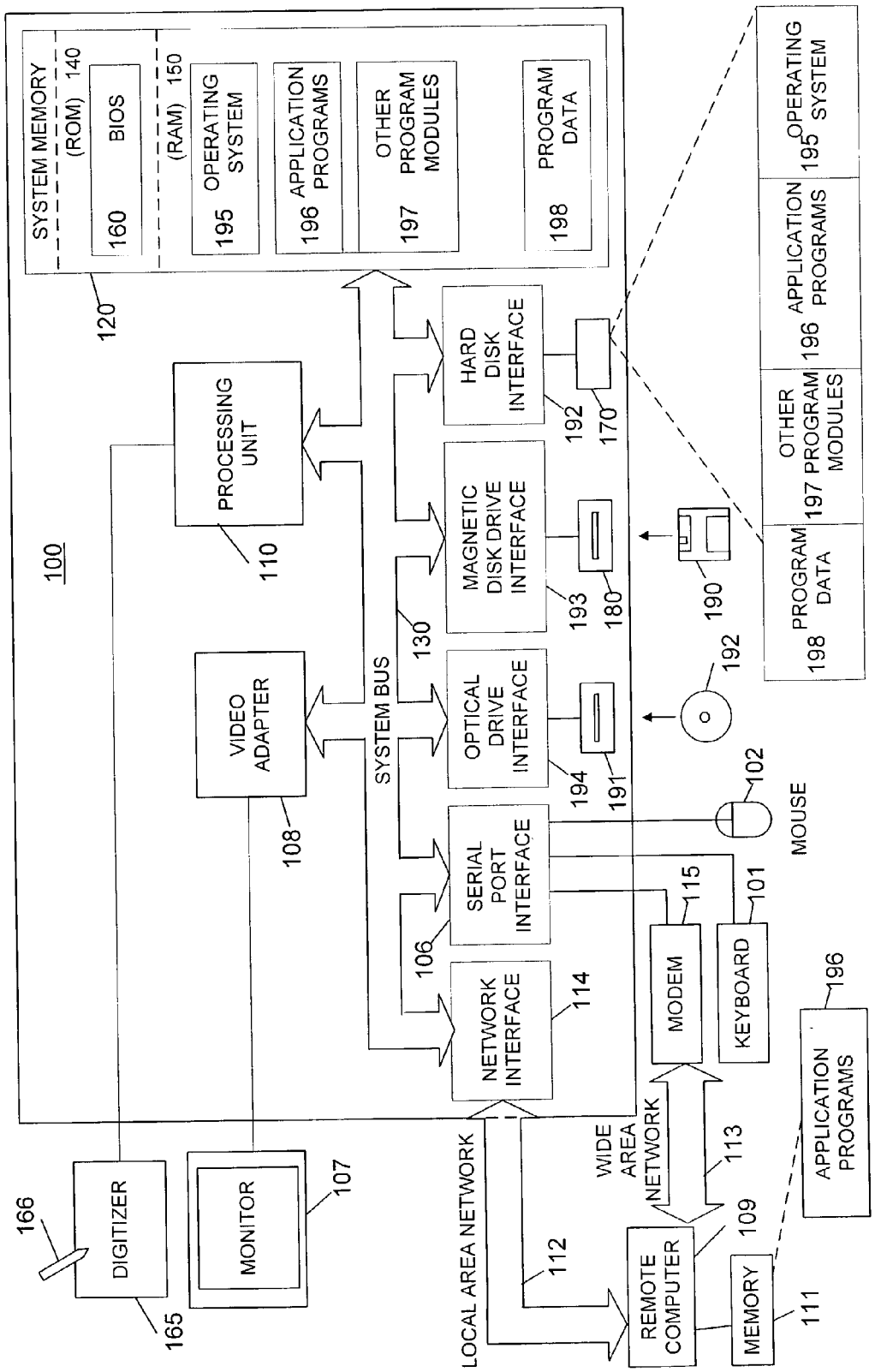
FIG. 1 is a functional block diagram of an illustrative general-purpose digital computing environment that can be used to implement various aspects of the invention.

FIG. 1 is a functional block diagram of an example of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during startup, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the processing unit 110 is shown, in practice, the pen digitizer 165 may be coupled to the processing unit 110 via a serial port, parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are exemplary and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
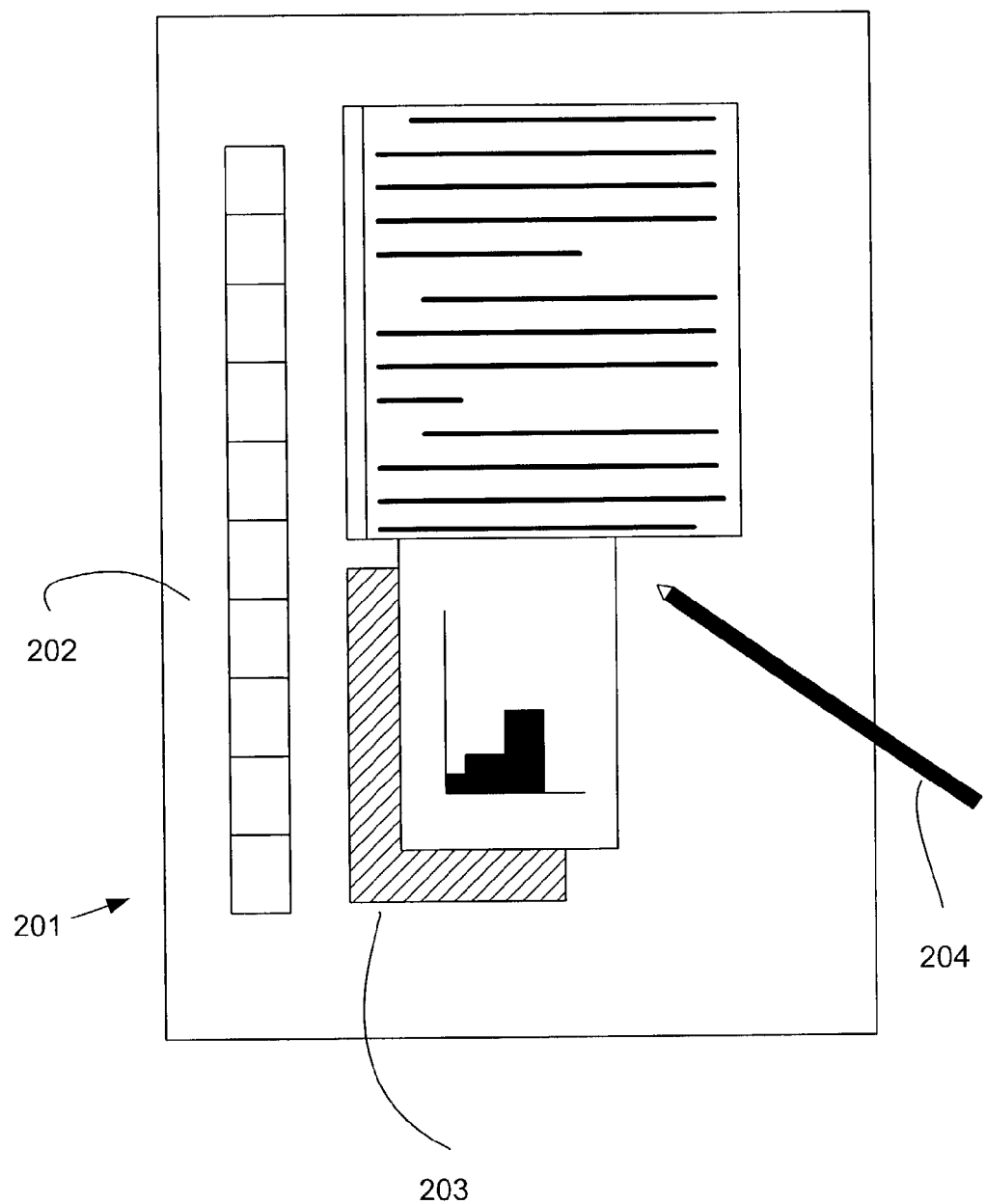
FIG. 2 is a plan view of an illustrative tablet computer and stylus that may be used in accordance with various aspects of the invention.

FIG. 2 shows an example of a stylus-based computer processing system (also referred to as a tablet PC) 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Other display technologies that may be used include, but are not limited to, OLED displays, plasma displays, and the like. Using the tip of the stylus 204 (the tip also being referred to herein as a "cursor"), a user can select, highlight, and write on the digitizing display area. Examples of suitable digitizing display panels include electromagnetic pen digitizers, such as the Mutoh or Wacom pen digitizers. Other types of pen digitizers, e.g., optical digitizers, may also be used. Tablet PC 201 interprets marks made using stylus 204 in order to manipulate data, enter text, and execute conventional computer application tasks such as spreadsheets, word processing programs, and the like.

A stylus could be equipped with buttons or other features to augment its selection capabilities. In one embodiment, a stylus could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be used for selecting or indicating portions of the displayed image on a touch-sensitive or proximity-sensitive display. Consequently, the term "user input device", as used herein, is intended to have a broad definition and encompasses many variations on well-known input devices.

Electronic Ink and the Concept of an Ink Object

Ink as used herein refers to electronic ink. Electronic ink may be structured as a sequence or set of strokes, where each stroke includes a sequence or set of points. A sequence of strokes and/or points may be ordered by the time captured and/or by where the strokes and/or points appear on a page. A set of strokes may include sequences of strokes and/or points, and/or unordered strokes and/or points. The points may be represented using a variety of known techniques including Cartesian coordinates (X, Y), polar coordinates (r, Θ), and other techniques as known in the art. A stroke may alternatively be represented as a point and a vector in the direction of the next point. A stroke is intended to encompass any representation of points or segments relating to ink, irrespective of the underlying representation of points and/or what connects the points. Ink collection typically begins at a digitizer (such as the digitizer of the display surface 202). A user may place a stylus on the digitizer and begin to write or draw. At that point, new ink packets (i.e., packets of ink-related data) may be generated. The user may also move the stylus in the air proximate enough to the digitizer so as to be sensed by the digitizer. When this occurs, packets of data (called herein "in-air packets") may be generated according to the sensed in-air movements of the stylus. Packets may include not only position information but also stylus pressure and/or angle information.

To store ink, an Ink object may be created that represents the original strokes of ink drawn by the stylus 204 upon the display surface 202 and/or other input. The collected strokes of ink may be collected from anywhere on the display surface 202 or only from a defined portion thereof, such as a particular window. The Ink object is essentially a container of ink data. The particular format of how ink is stored in the ink object is not important to the present invention. It is preferable, however, that the ink strokes as originally drawn are stored in the ink object.

Two illustrative types of ink objects may be defined. A tInk object (the "t" meaning "text") may be embodied as an OLE object representing ink that is expected to form letters or words. The tInk object allows the handwritten ink to be converted to text, such as by a text recognizer. The tInk object may be referred to as an ink object that relates to ink and having a textual context. The color and/or font size of the textual ink, as well as whether the textual ink should be underlined, bold, italic, and/or the like may be set programmatically and may be based on the attributes of the text around the tInk object. In other words, the ambient properties at the tInk object's intended insertion point may be applied to the tInk object. In one embodiment, the tInk object contains only a single word for submission to the text recognizer, such that a sentence may contain multiple tInk objects. On the other hand, an sInk object (the "s" meaning "sketch") may also be defined as an object representing ink that is not expected to form words. The sInk object may also be an OLE object. An sInk object may therefore be interpreted as a drawing or any other non-textual context. A sInk object may also be useful for representing multiple words. An ink-compatible application (and/or the user) may mark certain Ink objects as tInk objects and others as sInk objects. For the purposes of description, the two types of ink are described herein as "tInk" and "sInk." It is appreciated, however, that other names may be used to represent the various types of ink object that may be used. Also, alternative types of objects may be used to store electronic ink in any desired format.

Overview of Ink Controls API

Figure 3:
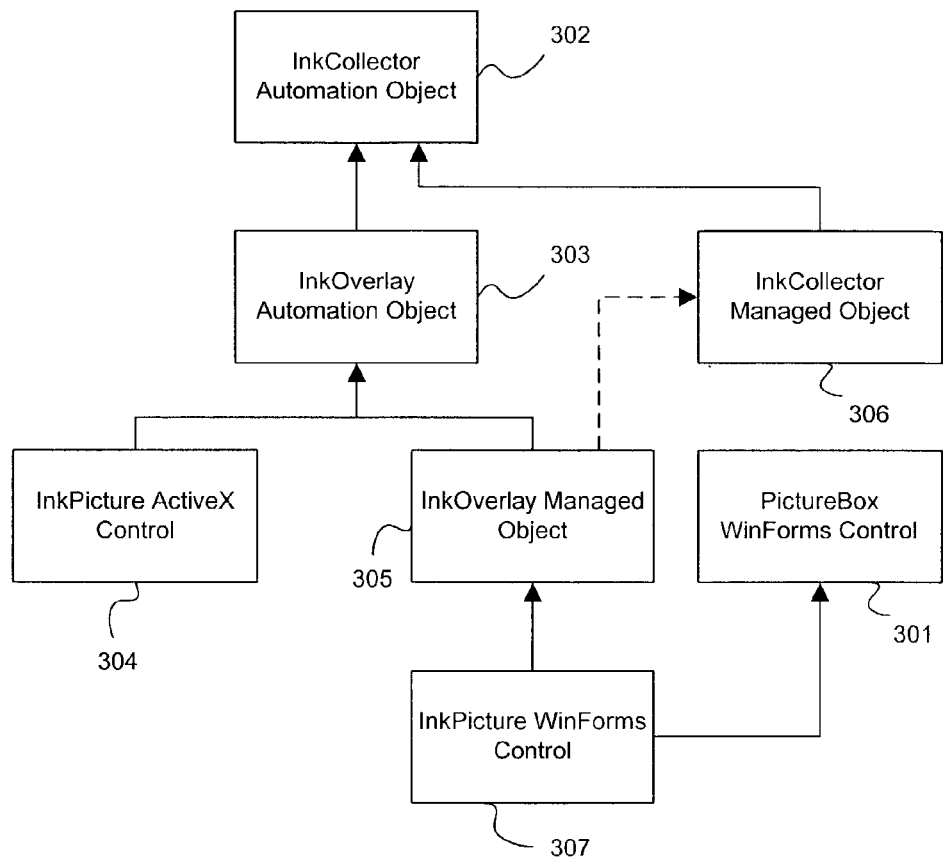
FIGS. 3-6 are functional block diagrams of illustrative architectures and interfaces that may be used in accordance with various aspects of the invention.

Referring to FIG. 3, an API called herein the Ink Controls API provides developers with a model for various objects and controls. The Ink Controls API may be available to developers using various application development software, such as Microsoft native Win32 COM API, Microsoft ActiveX API, and/or Microsoft Managed API. The Ink Controls API enables developers to easily add first-class support for ink to existing non-ink compatible applications and to new applications. The developer merely needs to add the appropriate controls and set various properties. The Ink Controls API further encourages the adoption of a consistent look and feel to ink-enabled applications; the Ink Controls API may serve as an excellent starting point for implementing a user experience. The Ink Controls API additionally provides inking user interface elements that developers would likely want but otherwise would have had to create themselves from scratch.

Various objects and controls of the Ink Controls API include an InkCollector automation object 302, an InkCollector managed object 306, an InkOverlay Automation object 303, an InkPicture ActiveX control 304, an InkOverlay managed object 305, a PictureBox WinForms control 301, and/or an InkPicture WinForms control 307. The InkCollector object 302 collects ink drawn by a user (such as on the display surface 202). The InkOverlay object enables developers to easily add annotation functionality to an application, and extends the ink-collection functionality of the InkCollector object 302 to provide support for basic editing such as selecting, moving, resizing, and erasing of ink. The InkPicture control encompasses some or all of the API elements of the InkOverlay object and allows developers to add an area to a window intended for the collection and editing of ink. The InkPicture control may further allow the developer to add background pictures, images, and/or colors to the window.

These objects and controls, described further below, may interact with one or more host applications such as an ActiveX host application (VB6, for example) and/or a Win32 host application (collectively, 301) and/or a common-language runtime (CLR) host application (VB7/C#) 306. The InkOverlay Automation object 303 and the InkPicture ActiveX control 304 may be used by native Win32/ActiveX developers, and the InkOverlay managed object 305 and the InkPicture WinForms control 307 may be used by developers who utilize CRL. In this figure, solid arrows represent an illustrative inheritance metaphor and broken arrows indicate an illustrative usage metaphor.

InkCollector Object

The InkCollector object is used to capture ink from an ink input device and/or deliver ink to an application. The InkCollector object acts, in a sense, as a faucet that "pours" ink into one or more different and/or distinct ink objects by collecting the ink as one or more ink strokes and storing the ink in one or more associated ink objects. The InkCollector object may attach itself to a known application window. It then may provide real-time inking on that window by using any or all available tablet devices (which may include the stylus 204 and/or a mouse). To use the InkCollector object, the developer may create it, assign which window to collect drawn ink in, and enable the object. After the InkCollector object is enabled, it may be set to collect ink in a variety of ink collection modes, in which ink strokes and/or gestures are collected. A gesture is a movement or other action of the stylus 204 that is interpreted not as rendered ink but as a request or command to perform some action or function. For example, a particular gesture may be performed for the purpose of selecting ink, while another gesture may be for the purpose of italicizing ink. For every movement of a stylus upon or proximate to the digitizer input, the InkCollector object will collect a stroke and/or a gesture.

InkOverlay Object

The InkOverlay object is an object useful for annotation scenarios where end users are not necessarily concerned with performing recognition on ink but may be interested in the size, shape, color, and position of the ink. It is well-suited for note-taking and basic scribbling. The primary intended use of this object is to display ink as ink. The default user interface is a transparent rectangle with opaque ink. InkOverlay extends the InkCollector class in several ways. For example, the InkOverlay object (and/or the InkPicture control discussed below) may support selecting, erasing, and re-sizing ink, as well as Delete, Cut, Copy, and Paste commands.

A typical scenario where the InkOverlay object may be useful is to mark up a document, such as by making handwritten comments, drawings, and the like over the underlying document. The InkOverlay object allows easy implementation of the inking and layout capabilities required for this scenario. For example, to work with InkOverlay object, one may instantiate an InkOverlay object, attach the InkOverlay to the hWnd of of another window, and set the InkOverlay Enabled property to True.

Figure 4:
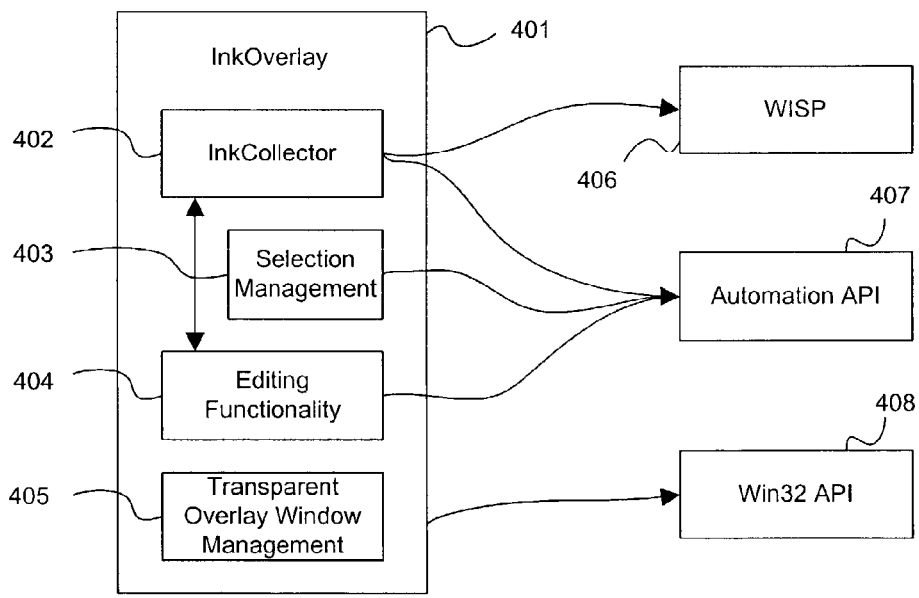

Referring to FIG. 4, a high-level block diagram of the component parts that make of the internals and the external dependencies of the InkOverlay object is shown. Arrows indicate a usage metaphor. An InkOverlay object 401 may receive ink from an InkCollector object 402. The InkOverlay object 401 may have selection management functionality 403 and/or editing functionality 404. As discussed in examples below, the InkOverlay object 401 may have transparent overlay window management functionality 405 in order to transparently overlay another object, window, or other displayed item such as a scanned-in paper form. Externally, the InkOverlay object 401 may interact with various applications and API. For example, an application may utilize the InkOverlay object 401 for implementing various low-level inking functions. In one embodiment, such an application may be Microsoft WINDOWS® INK SERVICES PLATFORM® (WISP) 406. It should be noted that application 406 is not limited to WISP, nor, like the other elements discussed herein, to the Microsoft WINDOWS® environment. The InkOverlay object 401 may further interact with an API that automates many of the lower-level WISP 406 functionality. In this embodiment, such an API is called Automation API 407. The Automation API 407 includes the Ink Controls API discussed above and provides developers with the object model that includes the Ink object, the InkCollector object, the InkOverlay object, and the Ink-Picture object. The InkOverlay object 401 may further interact with one or more operating system APIs such as the Microsoft WINDOWS® Win32 API 408 and/or Microsoft .NET® API.

The selection management functionality 403 of the Ink-Overlay object 401 supports the selection of ink. Ink may be selected in a variety of ways such as by means of a lasso tool (selection of objects contained in a traced region). The Ink-Overlay object 401 may also support tap selection, in which any Ink object that is clicked on and/or near is selected. When an Ink object or set of Ink objects is selected, re-size handles (e.g., eight re-size handles) may appear at the four corners of the ink's bounding box, as well as at one or more midpoints between adjacent corners. Moving the re-size handles may cause the selected ink to be re-sized in accordance with handle movement. Keyboard or other modifiers may be used to instruct the InkOverlay object to maintain the original aspect ratio while re-sizing. Ink may further be resized using any other means desired. Also, keyboard or other modifiers may be used to instruct the InkOverlay object to copy the selected ink during a drag operation instead of re-sizing the ink during dragging. If the user presses and holds anywhere within the selected region, the ink becomes movable inside the control. A rectangular selection metaphor, and/or a word, sentence, and/or paragraph selection metaphor may further be utilized. For example, clicking inside an ink word will select the word, clicking anywhere inside an ink sentence will select that entire sentence, and clicking anywhere inside an ink paragraph will likewise select the entire paragraph. Other means for selecting include utilizing particular gestures that indicate selection behavior, such as a single-click on or near an ink stroke indicating selection of the ink stroke, a double-click on or near a word selecting the entire word, and a triple-click selecting an entire sentence. In addition, ink may be selected and/or modified by directly calling the API of the InkOverlay object either programmatically or by end user input.

In addition, the InkOverlay object may provide for ink erasing functionality. For example, the InkOverlay object may provide for stroke-erase mode and/or point-erase mode. In stroke-erase mode, if the cursor is down and comes in contact with an existing ink stroke, that stroke is removed completely. In point-erase mode, if the cursor is down and comes in contact with an existing ink stroke, only the overlapping regions of the cursor and the ink stroke will be erased.

InkOverlay API

Figure 5:
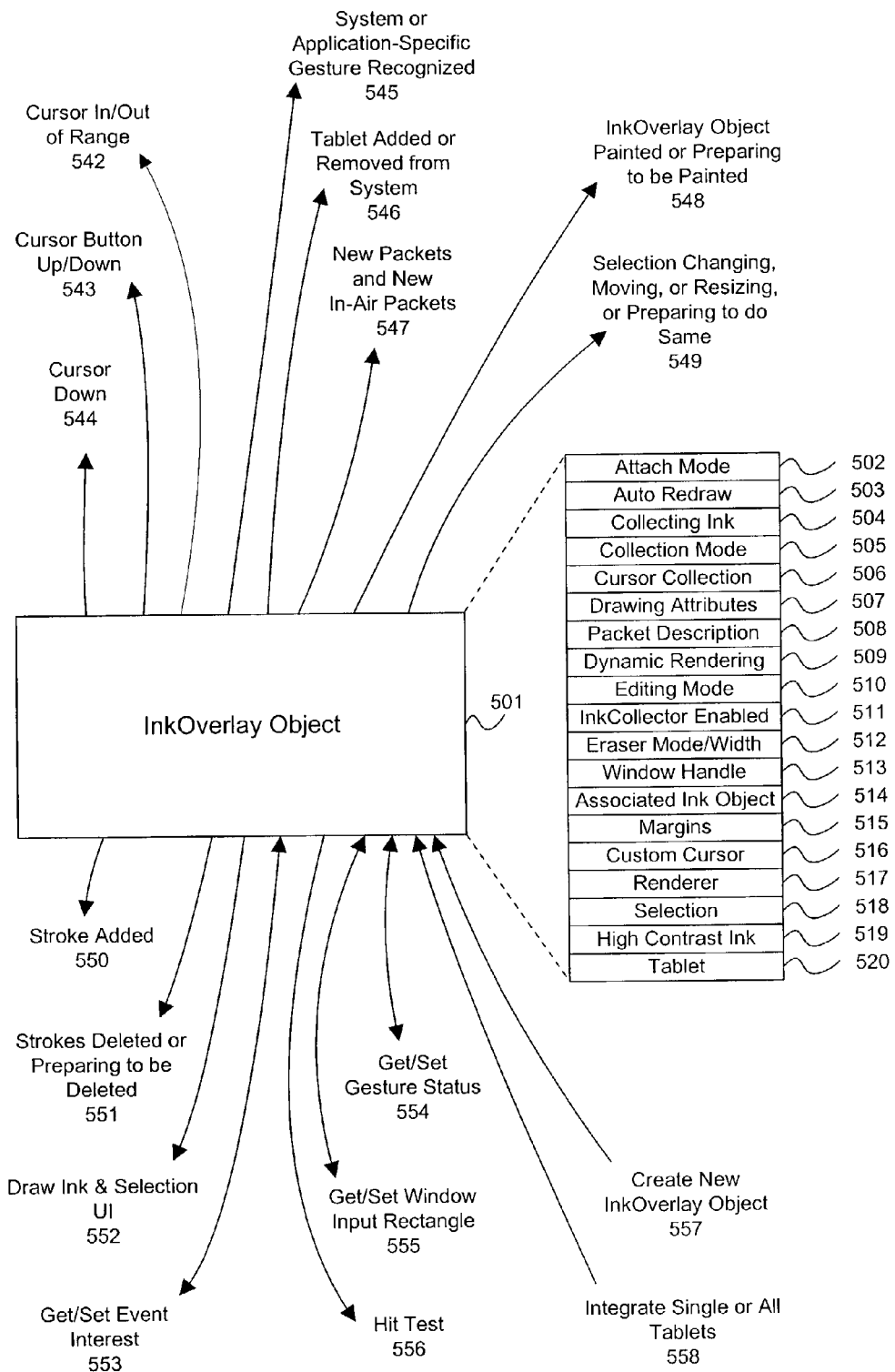

An illustrative application programming interface (API) for the InkOverlay object is now discussed with reference to FIG. 5. In FIG. 5, an InkOverlay object 501 is represented by a box, and various elements (or functionally-grouped elements) of an API are shown as labeled arrows 542-558 emerging from and/or entering the box representing the InkOverlay object 501. In general, arrows entering the InkOverlay object 501 box refer to API elements (or functionally-grouped elements) that for the most part modify the InkOverlay object 501 (e.g., by changing one of its properties) and/or otherwise provide information to the InkOverlay object 501. Arrow emerging from the InkOverlay object 501 box refer to API elements (or functionally-grouped elements) that for the most part represent a flag or some other information that is provided by the InkOverlay object 501 to its environment. However, the directions of the arrows are not intended to be limiting, and so an arrow entering the InkOverlay object 501 is not prevented from also representing information provided by the InkOverlay object 501 to its environment. Likewise, an arrow emerging from the InkOverlay object 501 is not prevented from also modifying or providing information to the InkOverlay object 501. FIG. 5 further shows a plurality of properties 502-520 of the InkOverlay object 501.

The InkOverlay API in the exemplary embodiment has some or all of the following enumerations (not shown), in any combination or subcombination. An application gesture enumeration defines values that set the interest in a set of application-specific gestures. A collection mode enumeration defines values that determine the collection mode settings of the InkOverlay object. An event interest enumeration defines which events the developer using the InkOverlay object and/or InkCollector object is interested in receiving. The InkOverlay object may use the event interest enumeration to determine which information will be provided to the developer via events. A mouse pointer enumeration defines values that specify the type of mouse pointer to be displayed. This enumeration also appears in the InkPicture control and the Ink-Collector object. An overlay attach mode enumeration defines values that specify where to attach the new InkOverlay object—behind or in front of controls and/or text in the window to which the InkOverlay object is attached. Where the InkOverlay object is attached in front, this means that the ink will be rendered in front of controls and/or text in the window. where the InkOverlay object is attached behind, this means that the ink will be rendered directly in the window to which it is attached, thus behind any other controls or child windows in the window hierarchy. An overlay editing mode enumeration defines values that specify which editing mode the InkOverlay object should use—drawing ink, deleting ink, editing ink. An eraser mode enumeration defines values that specify the way ink is erased when An editing mode enumeration is set to delete. A system gesture enumeration defines values that set the interest in a set of operating system-specific gestures.

The InkOverlay API in the exemplary embodiment also has one or more of the following properties, in any combination or subcombination, that can be set and that can return the information they represent. An attach-mode property 502 represents whether the object is attached behind or in front of the given window. An auto-redraw property 503 represents whether the InkCollector will repaint when the window is invalidated. A collecting-ink property 504 represents whether the object is busy collecting ink. A collection-mode property 505 represents whether the object is collecting only ink, only gestures, or both ink and gestures. A cursor collection-related property 506 represents the collection of cursors that have been encountered by the object. A drawing-attributes property 507 represents the default drawing attributes to use when collecting and displaying ink. The drawing attributes specified with this property are the attributes that are assigned to a new cursor, and may be applied to those cursors in the cursors collection for which default drawing attributes are set to null. A packet-description property 508 represents the packet description of the InkOverlay object 501. A dynamic-rendering property 509 represents whether the InkOverlay object 501 will dynamically render the ink as it is collected. An editing-mode property 510 represents whether the object is in ink mode, deletion mode, or selecting/editing mode. An Ink-Collector-enabled property represents whether the InkCollector will collect pen input (in-air packets, cursor in range events, and so on). Various eraser properties 512 represent whether ink is erased by stroke or by point and how ink is erased, and the width of the eraser pen tip. A window-handle property 513 represents the handle to which the InkOverlay object 501 attaches itself. An associated-Ink-object property 514 represents the Ink object that is associated with the Ink-Overlay object. Margin properties 515 represent the x-axis and y-axis margins, preferably in screen coordinates, of the InkOverlay object 501 around the window rectangle associated with the window handle that is attached. Also, the margin properties 515 may provide an alternate means of achieving the behavior associated with window rectangle methods 555 discussed below. One or more custom mouse cursor properties 516 represent the current custom mouse icon, the type of mouse pointer displayed when the mouse is over the InkOverlay object 501, such as over an inkable portion of the object, and/or the cursor that is displayed when the active pointing device (e.g., the stylus 204 or the mouse 102) causes the displayed cursor to be over the InkOverlay object. A renderer property 517 represents the renderer that is used to draw ink on the screen. A selection property 518 represents the collection of ink strokes that are currently selected. High-contrast-ink properties 519 represent whether the ink will be rendered in high contrast, e.g., just one color, and whether all selection UI (e.g., selection bounding box and selection handles) will be drawn in high contrast when the system is in high-contrast mode. A tablet property 520 represents the tablet that the object is currently using to collect cursor input.

The InkOverlay API in the exemplary embodiment also has a plurality of associated events and methods, in any combination or subcombination. For example, there may be cursor-related events and methods 542, 544. Such cursor-related events occur depending upon whether a cursor (such as the tip of the stylus 204) is within physical detection range of the tablet context, or responsive to the cursor being physically in contact with the digitizing tablet surface (e.g., surface 202). Cursor-related methods are called responsive to the respective cursor-related event being raised. These features may allow a developer to extend and override the InkOverlay object's cursor functionality.

The InkOverlay API may further have cursor-button-related events and methods 543. Such cursor-button events occur depending upon whether a button on the cursor (e.g., stylus 204) is up or is pressed down. Cursor-button-related methods are called responsive to the respective cursor-button-related event being raised. These features may allow a developer to extend and override the InkOverlay object's cursor button functionality.

The InkOverlay API may further have gesture-related events and methods 545, 554. Such gesture-related events occur responsive to a system gesture being recognized or an application-specific gesture being recognized. Certain gesture-related methods are called responsive to the respective gesture-related event being raised. Another gesture-related method specifies the interest of the InkOverlay object 501 in a given set of gestures, or retrieves that interest. These features allow a developer to extend and override the InkOverlay object's gesture functionality.

The InkOverlay API may further have tablet-related events and methods 546, 558. Some tablet-related events occur responsive to a tablet being added or removed from the system. Tablet-related methods are called responsive to the respective tablet-related event being raised. Other tablet-related methods 558 specify setting the InkOverlay object 501 into an all tablets mode or into an integrated tablet mode. In the all tablets mode (which may be a default mode), all tablet devices are integrated if there are multiple devices attached to the system. Because all of the tablet devices are integrated, available cursors may be used on any of the tablet devices, and each tablet will map to the entire screen using the same drawing attributes. In the integrated tablet mode, an integrated tablet-style computer input surface shares the same surface as the display screen; this means that the entire tablet-style computer input surface maps to the entire screen, allowing for automatic updating of a window.

The InkOverlay API may further have packet-related events and methods 547. Such packet-related events are responsive to newly-drawn packets and new in-air packets. Packet-related methods are called responsive to the respective packet-related event being raised. These features may allow a developer to extend and override the InkOverlay object's stylus functionality and responsiveness.

The InkOverlay API may also have painting-related events and methods 548. Such painting-related events occur just before the InkOverlay object 501 paints the ink along with any selection of ink, thereby allowing the developer an opportunity to alter the appearance of the ink or alter the ink itself. A painting-related event may also occur responsive to the InkOverlay object 501 having completed painting the ink a subset thereof, thereby allowing the developer to draw something in addition to the ink already drawn. Painting-related methods are called responsive to the respective painting-related event being raised. This functionality may allow the developer to extend and override the InkOverlay object's ink rendering behavior. These painting-related methods may also not actually be a part of the InkOverlay object, but instead may be available for the developer to implement such methods and connect them to the InkOverlay object such that they are appropriately called responsive to the painting-related events being fired.

The InkOverlay API may also have selection-related events and methods 549. Some selection-related events occur before the selection changes, thereby providing the developer the opportunity to alter the selection change which is about to occur. A selection-related event may also be responsive to the selection having completed changing—either programmatically or as a result of end-user action. Other selection-related events occur responsive to the position of the current selection being about to move or when the position of the current selection has changed. Still other selection-related events occur responsive to the size of the current selection being about to change or to size of the current selection having changed. Selection-related methods are called responsive to the respective selection-related event being raised. These features may allow a developer to extend and override the InkOverlay object's selection and editing functionality.

The InkOverlay API may further have ink-stroke-related events and methods 550, 551. One such stroke-related event is responsive to the user drawing a new stroke on any tablet. Other stroke-related events are responsive to strokes about to be deleted or strokes having been deleted. Stroke-related methods are called responsive to the respective stroke-related event being raised. These features may allow a developer to extend and override the InkOverlay object's ink-erasing functionality.

The InkOverlay API may have various further miscellaneous methods. For example, a draw method 552 may draw ink and selection UI for a specified rectangle in the provided device context (e.g., screen, printer, etc.). Other methods 553 set the current state of a particular InkOverlay event (e.g., whether the event is being listened for or used), or retrieve that current state. Still other methods 555 set specify the window rectangle to set, in window coordinates, within which ink is drawn, or retrieve that window rectangle. Another method 556 determines whether a given coordinate corresponds with one of the re-size handles, the inner portion of a selected region, or no selection at all. A constructor 557 specifies the creation of a new InkOverlay object that may be attached to a specified window handle, which may be on a specified tablet, and which may map a window input rectangle to a tablet input rectangle.

The InkOverlay API in the exemplary embodiment may also have various margin constants (not shown). A first margin constant returns a value that specifies whether to clip strokes when they are outside the default margin. A second margin constant returns the default margin used by the margin properties. These constants also appear as properties in the InkCollector object and the InkPicture control.

InkPicture Control

As previously mentioned, a control (called herein the InkPicture control) may be created (which may be, e.g., an ActiveX control) that allows developers to add a window intended for the collection and editing of ink. The InkPicture control provides the ability to place an image in an application or web page to which users can add ink. The image may be in any format such as .jpg, .bmp, .png, or .gif format. The InkPicture control may primarily be intended for scenarios where ink does not necessarily need to be recognized as text, but may instead or additionally be stored as ink. In an illustrative embodiment, the run-time user interface for the InkPicture control is a window with, e.g., an opaque background (such as single color, picture background, or both), containing opaque or semi-transparent ink. In an illustrative embodiment, the InkPicture control wraps the InkOverlay object with an ActiveX or other control.

InkPicture API

Figure 6:
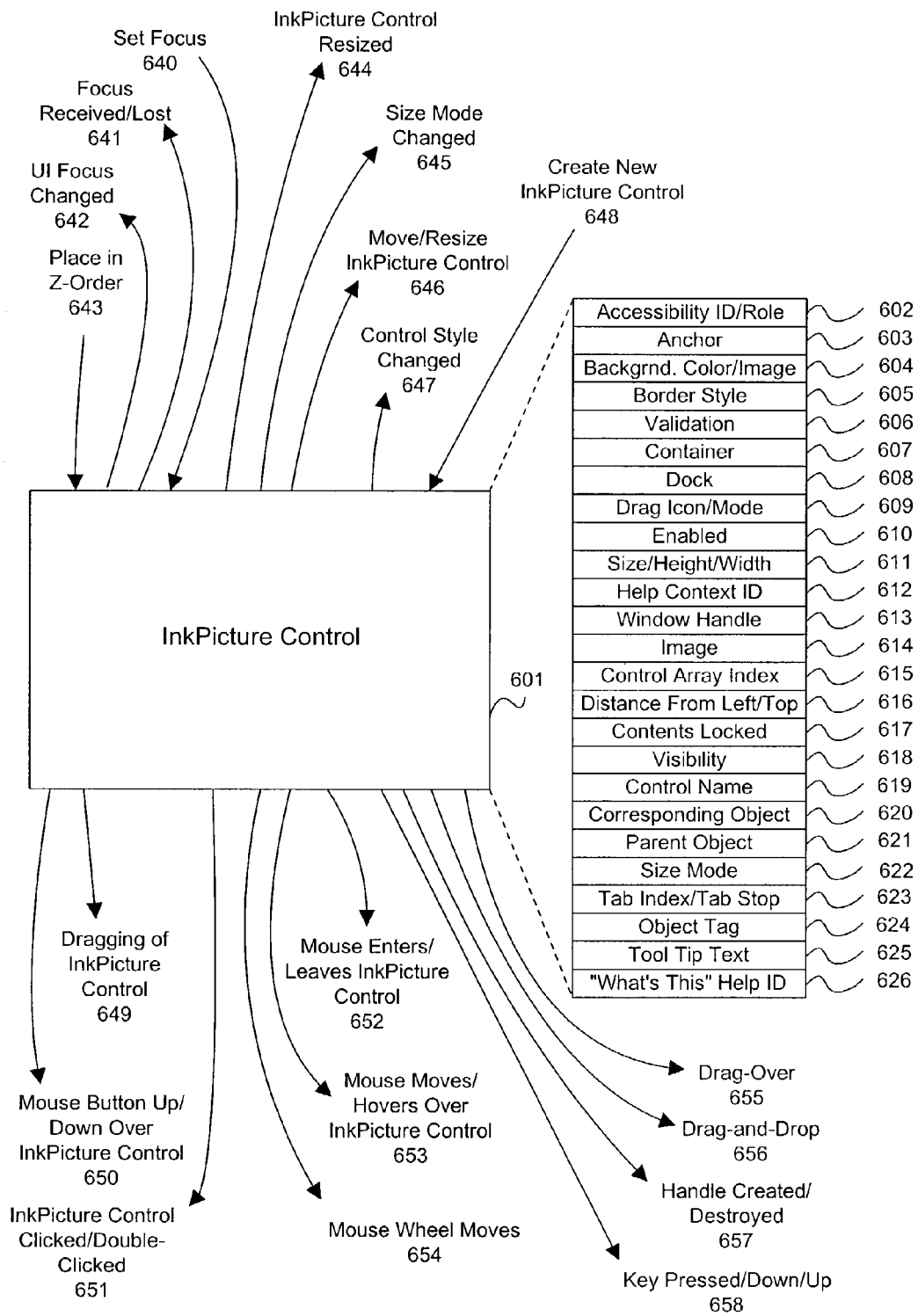

Referring to FIG. 6, an illustrative InkPicture control 601 is shown. The InkPicture control 601 exposes some or all of the API elements of the InkOverlay object 501, and additionally some or all of the API elements shown in FIG. 6. For example, in one illustrative embodiment, the InkPicture control 601 may allow access to all of the InkOverlay API elements with the exception of the attach mode property 502 and/or the window handle property 513. The InkPicture control 601 may have its own API, as discussed below, that adds to the functionality of the InkOverlay API. In some embodiments, the InkPicture control 601 may be an ActiveX control and may add the following functionality as compared with the InkOverlay object 501: keyboard events, control sizing events, additional mouse events, and/or background color and image-related properties. In addition, the InkPicture control 601 may inherit from Microsoft PictureBox. For instance, PictureBox may implement some or all of the properties discussed herein with regard to the InkPicture control 601, such as the background image.

In FIG. 6, the InkPicture control 601 is represented by a box, and various elements (or functionally-grouped elements) of an API are shown as labeled arrows 640-658 emerging from and/or entering the box representing the InkPicture control 601. In general, arrows entering the InkPicture control 601 box refer to API elements (or functionally-grouped elements) that for the most part modify the InkPicture control 601 (e.g., by changing one of its properties) and/or otherwise provide information to the InkPicture control 601. Arrows emerging from the InkPicture control 601 box refer to API elements (or functionally-grouped elements) that for the most part represent a flag or some other information that is provided by the InkPicture control 601 to its environment. However, the directions of the arrows are not intended to be limiting, and so an arrow entering the InkPicture control 601 is not prevented from also representing information provided by the InkPicture control 601 to its environment. Likewise, an arrow emerging from the InkPicture control 601 is not prevented from also modifying or providing information to the InkPicture control 601. FIG. 6 further shows a plurality of properties 602-626 of the InkPicture control 601.

In an illustrative embodiment, the API for the InkPicture control 601 may have one or more enumerations (not shown). For example, an ink-picture-size enumeration defines values that specify how a background picture behaves inside the InkPicture control, such as whether the picture will auto-size to fit within the control, or will center within the control, or will appear at its regular size within the control, or will be stretched within the control. Also, a user-interface enumeration defines values that specify the state of the user interface for the InkPicture control, such as the states of focus and keyboard cues, whether focus rectangles are displayed after a change in status, and/or whether keyboard cues are underlined after a change in status.

In the illustrative embodiment, the API for the InkPicture control 601 may have some or all of the various associated properties 602-626, in any combination or subcombination. For example, one or more accessibility properties 602 represent the name and description of the InkPicture control used by accessibility client applications, as well as the accessible role of the InkPicture control. An anchor property 603 represents which edges of the InkPicture control are anchored to the edges of its container. One or more background properties 604 represent the background color for the InkPicture control and background image displayed in the InkPicture control. A border-style property 605 represents the border style used for the InkPicture control. A validation property 606 represents whether the InkPicture control causes validation to be performed on any controls that require validation when focus is received. A container property 607 represents the container that contains the InkPicture control. A dock property 608 represents which edge or edges of the parent container the InkPicture control is docked to. One or more drag properties 609 represent the icon to be displayed as the pointer in a drag-and-drop operation and whether manual or automatic drag mode is used for a drag-and-drop operation. An enabled property 610 represents whether the InkPicture control is focusable. One or more dimensional properties 611 represent the height of the InkPicture control, the width of the InkPicture control and both the height and width of the InkPicture control. These dimensional properties may be in any units such as pixels. A context-sensitive help property 612 represents an associated context identification for the InkPicture control, and may be used to provide context-sensitive help for an application. A window-handle property 613 represents the handle of the window on which ink is drawn. An image property 614 represents the image displayed in the InkPicture control. A control array index property 615 represents the number identifying the InkPicture control in a control array. One or more positional properties 616 represent the distance between the internal left edge of the control and the left edge of its container and between the internal top edge of the control and the top edge of its container. A lock property 617 represents whether the contents of the InkPicture control can be edited. A visibility property 618 represents whether the InkPicture control is visible. A control name property 619 represents the name of the InkPicture control. An object property 620 represents the object corresponding to the InkPicture control. A parent object property 621 represents the object on which the control is located. A size mode property 622 represents how the InkPicture control handles placement and sizing of images. One or more tab properties 623 represents the tab order of the InkPicture control within its parent container and whether the user can use the Tab key to provide focus to the InkPicture control. An object tag property 624 represents extended properties, or custom data, about an object. A tool tip property 625 represents the text that is displayed when the mouse (or stylus) is paused over the InkPicture control. A help property 626 represents an associated context number for the InkPicture control. The help property 626 may be used to provide context-sensitive help for an application using the "What's This?" pop-up.

The InkPicture API in the illustrative embodiment may further have a plurality of associated events and methods, in any combination or subcombination. For example, a set focus method 640 specifies the focus should be assigned to the InkPicture control. One or more focus events 641 occur responsive to the InkPicture control losing focus or receiving focus. A user-interface focus event 642 occurs responsive to the focus or keyboard user interface cues changing. A z-order method 643 specifies that the InkPicture control be placed at the front or back of the z-order within its graphical level. A control size event 644 occurs responsive to the InkPicture control having been resized. A size mode event 645 occurs responsive to the size mode property 622 having been changed. A resize/move method 646 specifies the movement and/or resizing of the InkPicture control. A style event 647 occurs responsive to the style of the InkPicture control changing. A creation method 648 specifies the creation of a new InkPicture control. A drag method 649 specifies the beginning end, and/or cancellation of a drag operation on the InkPicture control. One or more mouse/stylus button events 650 occur responsive to the mouse/stylus pointer being over the InkPicture control and a mouse button (or a button of a stylus) being pressed or released. One or more click events 651 occur responsive to the InkPicture control being clicked upon or double-clicked upon. One or more mouse entry/exit events 652 occur responsive to the mouse/stylus pointer entering or exiting the diplayed area associated with the InkPicture control. One or more mouse move events 653 occur responsive to the mouse/stylus pointer moving over the InkPicture control or hovering over the InkPicture control. A mouse wheel event 654 occurs responsive to the mouse wheel moving while the InkPicture control has focus. A drag-over event 655 occurs responsive to an object being dragged over the bounds of the InkPicture control. A drag-and-drop event 656 occurs responsive to a drag-and-drop operation being completed. One or more handle methods 657 raise events responsive to a handle being created or destroyed. One or more key events 658 occur responsive to a key being pressed or released while the InkPicture control has focus. The InkPicture control 601 may further send any or all of the events discussed previously with regard to the InkOverlay object 501.

Overlaying of Electronic Ink

Figure 7:
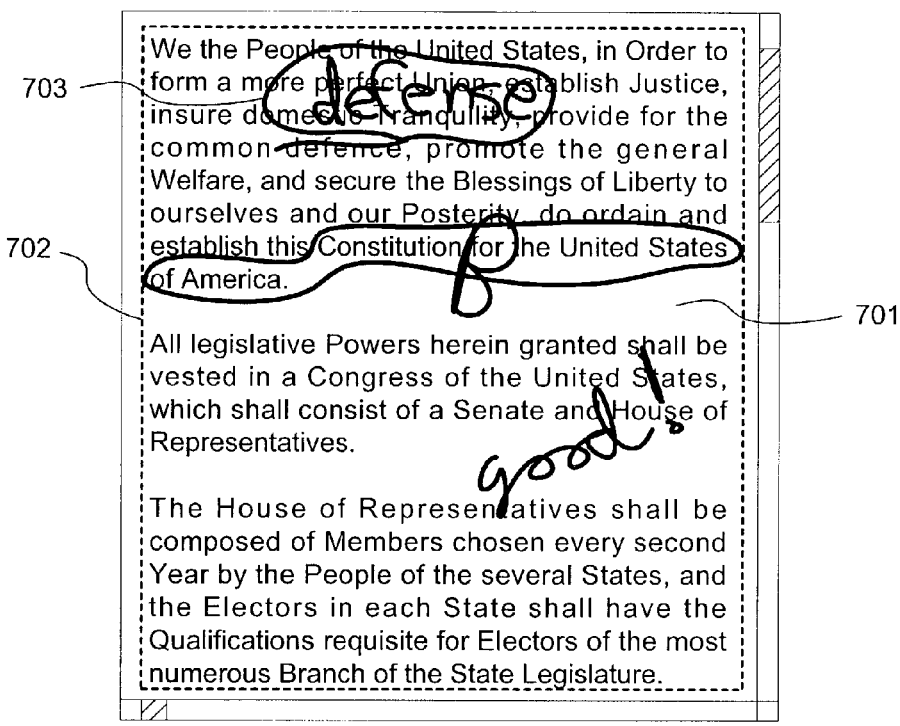
FIGS. 7-9 are illustrative screenshots of a document with one or more ink overlay objects in accordance with various aspects of the invention.

Referring to FIG. 7, a document 701 may be generated or otherwise provided. The document in the illustrative embodiment of FIG. 7 is a text document. However, the term document should be broadly construed herein to be any other type of document such as, but not limited to, a word-processing document (such as is generated using Microsoft WORD®), an image document, a graphical document, a text-plus-graphics document, a scanned paper document, a spreadsheet document, a photograph, and/or a form having a plurality of fields. The term "document," as used herein in describing the present invention, also includes within its scope a software application. An InkOverlay object and/or an InkPicture control may be defined to create one or more inking surfaces (such as windows) disposed over some or all of the document 701. The window or other inking surface may preferably be transparent (either fully transparent or semi-transparent) such that the document 701 underneath is viewable. However, some or all of the window may be opaque and/or may have a background image and/or color (such as by use of one or more of the illustrative background properties 604 of the illustrative InkPicture control). Where a background image is used, the background image may be the document itself as an alternative to overlaying the window over a separate document. The window may optionally have a border 702 (shown herein illustratively as a dotted line) that may be opaque or otherwise visible. When a user writes on the screen in the area of the window using the stylus 204, ink data is collected from the handwriting, and the ink data may be rendered and displayed in the window as electronic ink 703. Thus, it may appear as though the handwritten ink is being written on the document 701. The ink data may also be stored in an object such as in the ink object. Also, one or more events, such as painting-related events 548, may trigger during rendering and/or at the beginning of rendering, and/or upon the rendering of the ink being completed.

The user may further select a portion of the ink 703 already rendered and change the selected portion in a variety of ways. Where at least a portion of the ink 703 is selected (e.g., by circling the selected portion with the stylus 204), a reference to the selected portion may be stored. The selection portion may be moved and/or resized, in which case one or more events, such as events 549, may trigger during the selection moving or being resized and/or at the beginning of the moving or resizing, and/or upon the selection having completed moving or resizing. Some or all of the ink 703 (such as one or more strokes) may further be deleted. The user and/or an application, for example, may request that at least a portion of the ink 703 be deleted, and one or more events, such as events 551, may trigger during the ink being deleted and/or at the beginning of the ink being deleted, and/or upon the ink having been deleted.

In view of the above, an application developer may have programmatic access (i.e., be able to modify the internal structures directly, and not necessarily via the user input or control APIs) to the ink inside the InkOverlay object and/or the InkPicture control. The developer and/or user may further be able to modify the selection of ink and/or various other properties. The InkOverlay object may then manage the internal details of establishing a tablet context, listening for digitizer events, and/or collecting and interpreting ink strokes according to its current mode.

Figure 8:
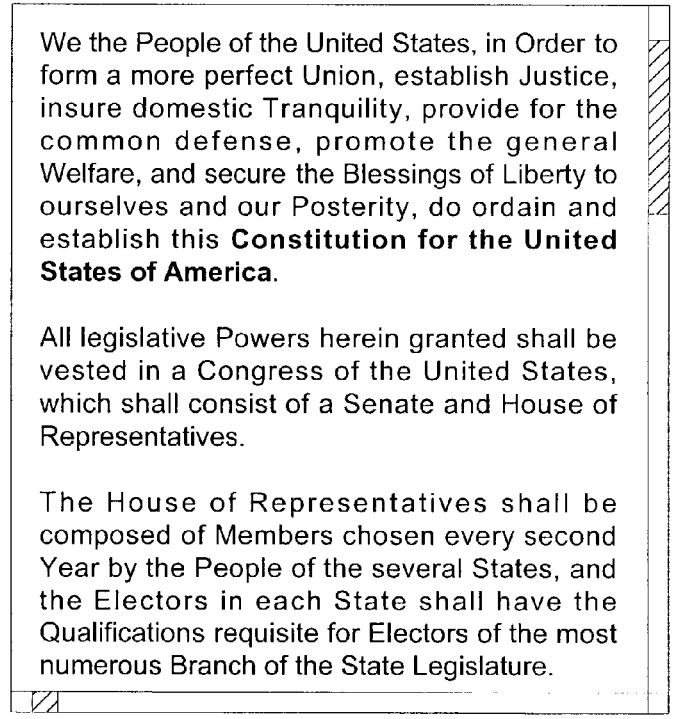

For example, the developer may easily have access to events associated with new strokes, and may compare the position of the new ink strokes to text and/or objects in the underlying document 701 by retrieving position metadata from the new strokes. Thus, by having access to the various events and methods described herein, an application developer may add data structures to an application to facilitate mapping ink to application data. This may allow, for instance, gestures and/or other commands to be issued by the user and/or an application, via the InkOverlay object, to modify the underlying document 701. For instance, as shown in FIG. 7, a portion of the text in the document 701 is encircled by ink and a large "B" is drawn in the encirclement. This may be interpreted as a command to modify the text in the document 701 that is encircled to be boldface text. Or, a word may be deleted and/or inserted such as is shown in FIG. 7 (e.g., the word "defence" in the underlying document 701 is deleted and replaced with newly-inserted word "defense") using a gesture and/or other command. The result of these gestures is shown in FIG. 8.

The developer may further easily configure his or her application to rearrange ink in the InkOverlay object as underlying text and/or objects in the underlying document 701 move. This may be accomplished, for example, by locating ink strokes in the InkOverlay object window and to move and/or resize the strokes.

The developer may further easily extend the InkOverlay object's native editing functionality by listening for various events as described herein to include various concepts such as highlighting. This may be accomplished, for example, by overriding the default drawing attributes property. The developer may also add functionality such as selective read-only strokes (through selectively rejecting user-manipulation of specific strokes), as well as parsing (through feeding strokes into a recognizer) and/or natural user-gestures like erasing with the back of the stylus 204 (by listening for "newcursor" events and switching the InkOverlay control's mode).

Figure 9:
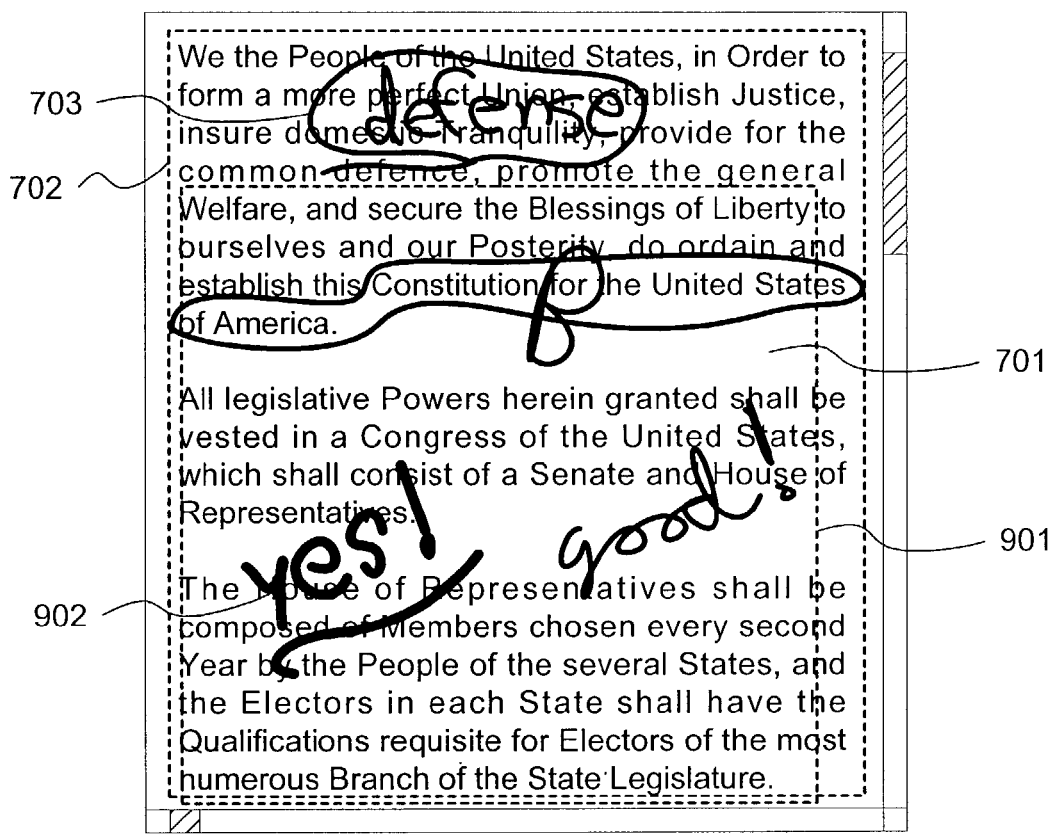

Also, more than one InkOverlay object and/or InkPicture control may be disposed over the document 701 at any one time, and these multiple objects and/or controls may be layered. Referring to FIG. 9, a second InkOverlay object (for example) may be instantiated and may have a second window with a second optional border 901. The same user or another user may write ink 902 on the second InkOverlay object window, and the associated ink data may be stored in the InkOverlay object and/or rendered in the window of the second InkOverlay object. Alternatively, the user may write ink into the first InkOverlay object window at a location where the first and second windows overlap, and the ink may be sent to the second window.

While exemplary systems and methods as described herein embodying various aspects of the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments. Although the invention has been defined using the appended claims, these claims are exemplary in that the invention is intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It is intended that the written description of the invention contained herein covers all such modifications and alterations. Also, it should be recognized that although various names of objects and other API elements are provided herein, such names are merely illustrative and any names may be used without departing from the scope of the invention.

We claim:

1. A method for overlaying ink on a document, the method comprising the steps of:
    displaying the document in a first window, the first window having a handle;
    generating a transparent second window over the first window;
    attaching the second window to the handle of the first window;
    collecting ink data in the second window; and
    rendering the ink data as rendered ink in the second window.

2. The method of claim 1, wherein the second window has an opaque border.

3. The method of claim 1, further including the steps of:
    generating a first event during the step of rendering; and
    generating a second event upon the step of rendering being completed.

4. The method of claim 1, further including the steps of:
    receiving a request from a software application separate from the second window to delete at least a portion of the rendered ink;
    generating a first event in response to the request;
    deleting the at least the portion of the rendered ink; and
    generating a second event upon the step of deleting being completed.

5. The method of claim 1, further including the steps of:
    receiving a request from a software application separate from the second window to select at least a portion of the rendered ink;
    selecting the at least the portion of the rendered ink; and
    storing a reference to the at least the portion of the ink.

6. The method of claim 1, further including the steps of:
    selecting at least a portion of the rendered ink;
    receiving a request from a software application separate from the second window to change the at least the portion of the rendered ink;
    generating a first event in response to the request;
    changing the at least the portion of the rendered ink; and
    generating a second event upon the step of changing being completed.

7. The method of claim 6, wherein the step of changing includes changing an amount of the at least the portion of the rendered ink that is selected.

8. The method of claim 6, wherein the step of changing includes changing the at least the portion of the rendered ink to another at least a portion of the rendered ink.

9. A computer-readable medium storing computer-executable instructions for performing the steps recited in claim 1.

10. The method of claim 1, further including a step of a software application that corresponds to the first window requesting generation of the second window.

11. The method of claim 1, further including setting a property that is associated with the second window and that represents the handle of the first window.

12. The method of claim 1, further including reading a property that is associated with the second window and that represents whether the second window is in an ink-only collection mode, a gesture-only collection mode, or a gesture-and-ink collection mode.

13. The method of claim 1, further including a step of a software application separate from the second window selecting at least a portion of the ink data in the second window.

14. The method of claim 1, further including a step of a software application separate from the second window requesting to modify at least a portion of the ink data in the second window.

15. A method for overlaying ink on a document, the document being displayed in a first window, the first window having a handle, the method comprising the steps of:
   generating a second window, the second window being at least partially transparent and being generated over at least a portion of the document;
   attaching the second window to the handle of the first window;
   collecting ink data in the second window in a location over the at least the portion of the document; and
   rendering the ink data as rendered ink,
   wherein the ink data defines a command, and further including a step of modifying a content of the document in accordance with the command.

16. The method of claim 1, wherein the ink data defines a command, and further including a step of modifying a content of the document in accordance with the command.

17. A computer-readable medium storing computer-executable instructions for performing steps comprising:
   displaying a document in a first window associated with a software application;
   the software application using an application programming interface to request that a transparent second window be generated over the document;
   receiving stylus input directed to the second window;
   generating ink data from the stylus input; and
   rendering the ink data as rendered ink in the second window over the document.

18. The method of claim 17, wherein the stylus input is made on a touch-sensitive display, and wherein the step of rendering includes rendering the ink data on the touch-sensitive display.

* * * * *